United States Patent
Harwit et al.

(10) Patent No.: US 6,867,921 B2
(45) Date of Patent: Mar. 15, 2005

(54) FOCUS-POSITION COMPENSATOR

(75) Inventors: Alex Harwit, San Mateo, CA (US);
Paul Robb, Sunnyvale, CA (US);
Janusz Liberkowski, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/825,938

(22) Filed: Apr. 16, 2004

(65) Prior Publication Data

US 2004/0233539 A1 Nov. 25, 2004

Related U.S. Application Data

(62) Division of application No. 10/325,648, filed on Dec. 18, 2002, now Pat. No. 6,791,759.

(51) Int. Cl.[7] ............................................. G02B 27/10
(52) U.S. Cl. ........................................ 359/619; 359/626
(58) Field of Search .................................. 359/619–621, 359/625, 626

(56) References Cited

U.S. PATENT DOCUMENTS

| | | | |
|---|---|---|---|
| 5,661,531 A | 8/1997 | Greene et al. | |
| 5,973,844 A | 10/1999 | Burger | |
| 6,101,040 A * | 8/2000 | Itoh | ............................ 359/622 |
| 6,124,974 A | 9/2000 | Burger | |
| 6,381,072 B1 | 4/2002 | Burger | |
| 2003/0063390 A1 * | 4/2003 | Brown | ........................ 359/619 |

* cited by examiner

*Primary Examiner*—Ricky Mack
(74) *Attorney, Agent, or Firm*—Blakely, Sokoloff, Taylor & Zafman LLP

(57) ABSTRACT

The present invention is directed towards a focus-position compensator for reducing focus variations on a microlens array. The focus-position compensator comprises a plurality of tiles that are affixed to a structure disposed between the lenslets of the microlens array and the target of the collimated light from the lenslets. Each tile refractive index and tile thickness is chosen to obtain a tile focus-position correction that will apply to a region of the microlens array.

13 Claims, 5 Drawing Sheets

FOCUS-POSITION COMPENSATOR

CROSS-REFERENCE TO RELATED APPLICATIONS

This application is a divisional of, and claims priority under 35 U.S.C. §120 from, U.S. patent application Ser. No. 10/325,648, filed Dec. 18, 2002, now U.S. Pat. No. 6,791,759.

FIELD OF THE INVENTION

This invention relates to focus-position compensators for microlens arrays. More particularly, it relates to using tiles to affect the focus-position compensation.

BACKGROUND OF THE INVENTION

Associated with the information revolution is a need to increase by many orders of magnitude the rate of information transfer. This revolution is enabled by the switch from copper wire to optical fiber. Efficient implementation of this change requires optical switches to move data from one fiber to another. For a large number of input and a large number of output fibers, this switch is typically referred to as an optical crossbar switch.

A typical component of an optical crossbar switch is a fiber array coupled to a microlens array in such a way that an array of substantially collimated and parallel beams leave the assembly. A schematic of a microlens array is illustrated in FIG. 1. Each microlens array 100 is comprised of a plurality of lenslets 110. In the typical case, each optical fiber is associated with a single lenslet 110.

A one-to-one mapping exists between fibers and optical beams leaving the assembly. The system performance is enhanced if each optical beam is substantially focused on the end of its respective optical fiber. The construction of such a system is simplified if all of the beams focus through the microlens array at substantially the same distance. In such a case, the ends of all the optical fibers are arranged on a plane that is a uniform distance from the microlens array. This requires that the microlens array have a high degree of uniformity with respect to the distance at which each lenslet focuses.

Manufacturing a microlens array with sufficiently high uniformity with respect to the focus distance is expensive. Most often, the problem is associated with variations in the focal length of the individual lenslets. However, for the purposes of this patent document, variations in the focus or focus distance can be due to focal-length variations of the lenslets or any other source of nonuniformity. In more affordable microlens arrays the focus distance tends to vary slowly across the array. A typical variation is illustrated in FIG. 2. For this particular microlens array, the low regions 120 indicate portions of the microlens array for which the focus distance is as much as 3% less than the nominal value. The high regions 130 indicate portions of the microlens array for which the focus distance is as much as 4% greater than the nominal value.

To reduce the cost of an optical crossbar switch and maintain satisfactory performance, a means for compensating for the microlens focus variations needs to be developed.

SUMMARY OF THE INVENTION

Embodiments of the invention include a variety of focus-position compensators for reducing the focus variations of a microlens array. For the purposes of this application, reducing the focus variations is to be interpreted broadly. The reduction in variations can be associated with reduced maximum variations, reduced mean-square variations, reduced root-mean square variations, or some other rational measure of focus variations.

Focus-position compensators of the present invention include a plurality of tiles. Each tile has its index of refraction and its thickness chosen to obtain a specified tile focus-position adjustment or correction. The tiles are disposed in relation to the microlens array such that the effects of focus variations of the microlens array are reduced.

The invention also includes methods for making focus-position compensators for a microlens array. To practice the method, the spatial variation of focus distances of the microlens array is determined. To reduce the spatial variation of the focus distances to within a desired limit, tiles are placed in the light path between the microlens array and optical fibers. The number of tiles, the spatial distribution of tiles, and the tile focus-position corrections are chosen. For each tile, the tile focus-position correction is a function of the tile thickness and the tile refractive index; hence these properties are selected for each tile.

A reference thickness is chosen that is greater than or equal to the maximum of all the tile thicknesses. Spacer-block thicknesses are determined for all the tiles. The spacer-block thickness is equal to the difference between the reference thickness and the tile thickness. The tiles are constructed, each having its specified thickness and refractive index. All spacer blocks with non-zero spacer-block thickness are constructed.

A tile tray having a receptacle for receiving each tile is micromachined. The receptacles are positioned so that when populated with tiles, each tile will be properly situated relative to the other tiles.

The spacer blocks and tiles are placed in their receptacles. If the corresponding spacer block exists (i.e., the spacer block has non-zero thickness) then the tile is placed on top of the spacer block. For tiles that don't have a corresponding spacer block, the tile is simply placed into its receptacle.

A curable bonding material is placed on top of each tile. An intervening structure is placed on the curable bonding material. The intervening structure can be the substrate of the microlens array, a fiber-block window attached to optical fibers, or a window otherwise disposed between the optical fibers and the microlens array. The bonding material is then cured, securing the tiles to the intervening structure. The tile tray and spacer blocks are then removed.

In lieu of the curable bonding material, adhesive free bonding or fusion bonding may be used to bond the tiles to the intervening structure.

Additional features and advantages of the invention will be set forth in part in the description that follows, and in part will be obvious from the description, or may be learned by practice of the invention. Various embodiments of the invention do not necessarily include all of the stated features or achieve all of the stated advantages.

BRIEF DESCRIPTION OF THE DRAWINGS

The accompanying drawings illustrate a complete embodiment of the invention according to the best modes so far devised for the practical application of the principles thereof, and in which:

FIG. 3A shows the example situation prior to the application of tiles. FIG. 3B shows the same case after the application of tiles.

In FIG. 4A, the tiles are affixed to the substrate of the microlens array. In FIG. 4B, the tiles are affixed to a window between the fiber array and the microlens array. In FIG. 4C, the tiles are affixed to the fiber-block window.

FIG. 5A is an example microlens array. FIG. 5B shows a tile tray. FIG. 5C shows different thickness tiles in the receptacles of the tile tray. FIG. 5D shows the microlens array with the focus-position compensator.

DETAILED DESCRIPTION OF PREFERRED EMBODIMENTS

Figure 1:
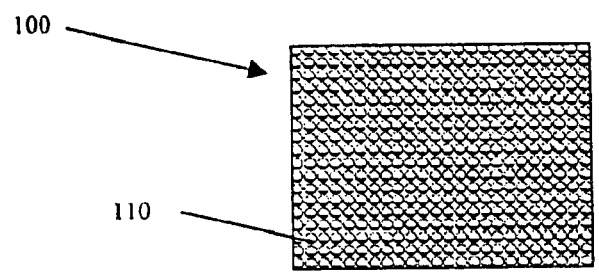
FIG. 1 shows a microlens array.
Figure 2:
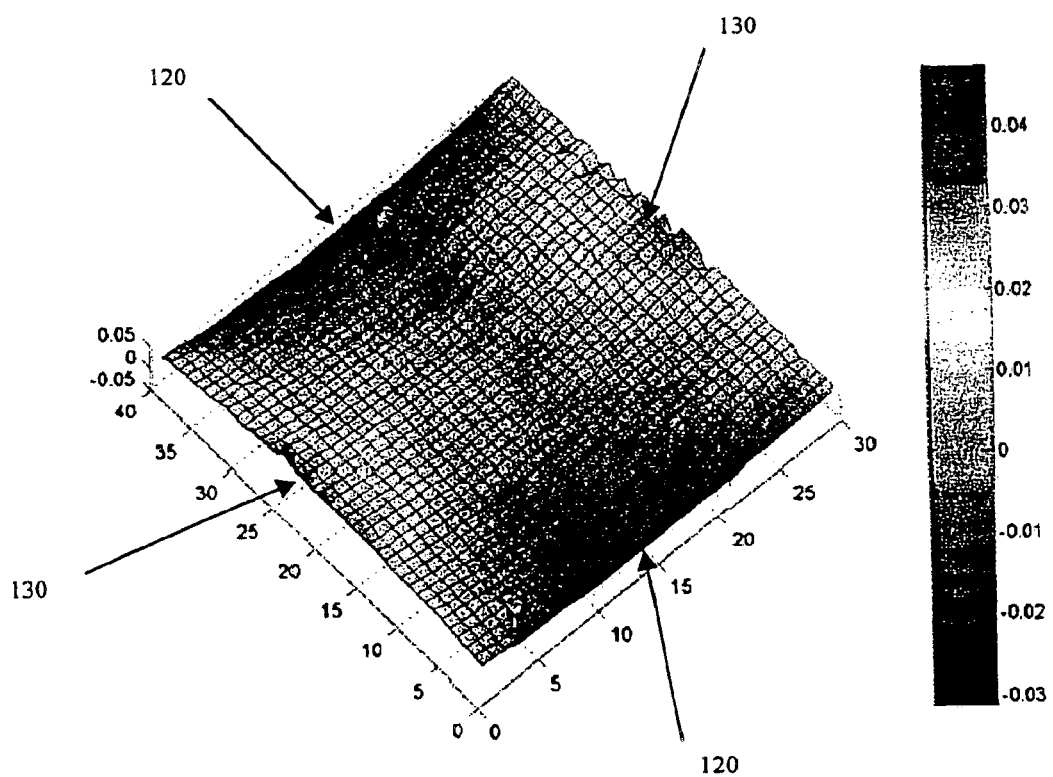
FIG. 2 illustrates a typical focal length variation induced focus-distance variation across a microlens array.

Referring now to the drawings, where similar elements are numbered the same, FIG. 1 depicts a microlens array 100 comprised of lenslets 110 (only one of which is labeled). As shown in FIG. 2, the focus distance of the microlens array is typically not uniform. However, in many instances the focus distance varies slowly across the microlens array, hence regionally compensating for focus variations can significantly reduce the variation. The present invention employs the use of tiles to produce regional focus-position compensations.

Preferred embodiments of a focus-position compensator include a plurality of tiles. Each tile has a tile refractive index $n_i$ and a tile thickness $t_i$ where i is a unique designator for each tile. The tile refractive index for each tile is substantially uniform over the tile. Similarly, the tile thickness for each tile is substantially uniform over the tile. The tile refractive index and the tile thickness are chosen to obtain a tile focus-position correction $\Delta_i$. Because of the substantial uniformity of the tile refractive index and the tile thickness over the tile, the tile focus-position correction is itself substantially uniform over the tile.

The tile focus-position correction is chosen to reduce the effects of the focus variation of the microlens array. Once the focus variation of the microlens array is known, appropriate focus distance increases can be mapped to each region of the microlens array, with a tile corresponding to each region. The tile is disposed in relation to the microlens array such that the effects of focus variations of the microlens array are reduced. The spatial relationship between the tiles and the microlens array should ensure that the tiles are in the light path between the lenslets and the target of the substantially collimated light.

In most instances, the microlens array is rectangular; hence tiles having a rectangular planform are preferred. However, the broad scope of the invention is intended to include microlens arrays that are not rectangular and also tiles that do not have rectangular planforms, even if the microlens array is rectangular.

Figure 3A:
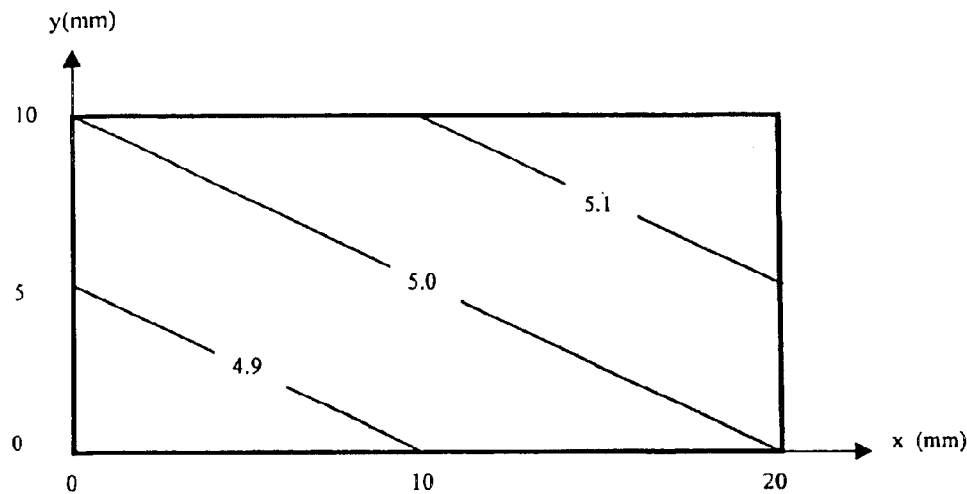
FIGS. 3A–B show contour plots of the focus distance before and after application of tiles.
Figure 3B:
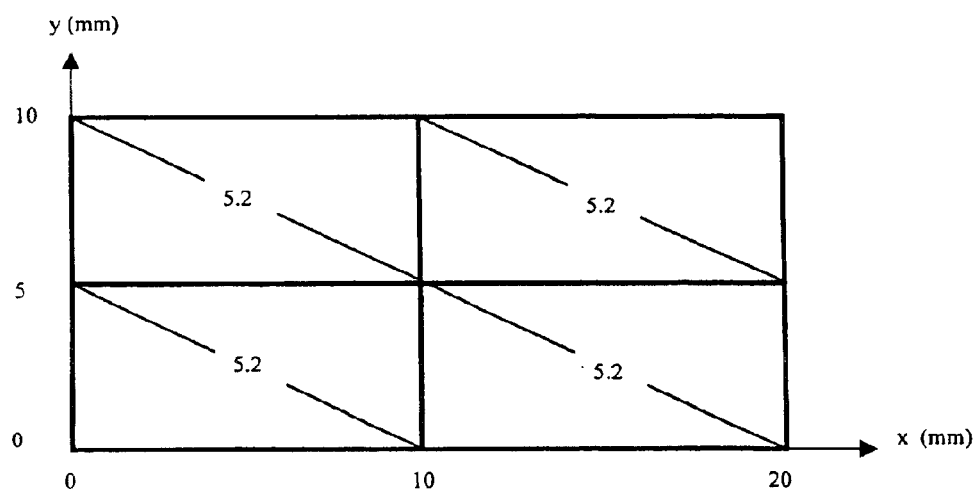

A simple example is illustrated in FIGS. 3A–B. FIG. 3A shows contours of the focus distance of a microlens array. For simplicity, the focus distance is shown as a continuous variable. In reality, each lenslet has its own focus distance, so focus distance only has meaning at the discrete lenslets. However, with a dense microlens array, where the focus distance varies slowly from lenslet to lenslet, a continuous function is a good approximation to the actual situation. In this example, the focus distance varies according to the equation f=4.8 mm+0.02(0.5 x+y), where x and y are measured in mm. This means that at position x=0, y=0, the focus distance is 4.8 mm but as x and y increase, the focus distance increases linearly. In the middle of the microlens array at x=10 mm and y=5 mm, the focus distance is 4.8 mm+0.2 mm=5.0 mm. At the upper right edge of the microlens array at x=20 mm and y=10 mm, the focus distance is 4.8 mm+0.4 mm=5.2 mm. Therefore the focus distance varies 4% higher and lower than its central value of 5.0 mm.

Suppose that four tiles are chosen to correct the effects of the microlens focus variation. For simplicity, each tile will be rectangular and will have nominal dimensions of 10 mm in the x direction and 5 mm in the y direction. The tiles are evenly spaced on the microlens array as shown in FIG. 3B. As discussed later, in practice, gaps will probably exist between each tile. Even if the tiles are assembled so that no gap exists, the focus-position correction can be discontinuous at the tile boundaries; hence the tile boundaries are preferably aligned with boundaries between lenslets. In this example, a focus-position correction of 0.3 mm is used for the lower-left tile; 0.2 mm for the top left and lower right tiles; and 0.1 mm for the tile at the top right. The focus position for light incident at the center of each tile is now corrected in such a way that the maximum focus variation is only 0.1 mm, or slightly less than 2%, similar to a microlens array with a focal length of 5.2±0.1 mm.

Alternatively, a focus-position correction of 0.2 mm could be used for the lower-left tile; 0.1 mm for the top left and lower right tiles; and no correction for the tile at the top right. The focus position for light incident at the center of each tile would now be similar to a microlens array with a focal length of 5.1 mm and the maximum variation would remain 0.1 mm. Whether the original or alternative correction scheme is used will depend upon factors specific to each application of the invention. Both correction schemes are considered to be within the scope of the invention.

The focus-position corrections can be achieved by adjusting the tile thickness, the tile refractive index, or both. In most cases, the focus-position correction is related to these parameters by the equation: $\Delta_i = t_i(1 - n_{media}/n_i)$, where $n_{media}$ is the refractive index of the media that the tile is supplanting. For most cases of practical interest, the media is air, some inert atmosphere, or a vacuum. Generally, $n_{media}$ can be approximated as 1 in those cases. Other appropriate relationships between the focus-position correction, the tile thickness, the tile refractive index, and the index of refraction of the external media, as well as other relevant parameters may be used when required by the situation.

In the original scheme of the previous example, taking $n_{media}=1$, all of the tiles could have been made with thickness 0.6 mm. In this case, to achieve a 0.3 mm focus-position correction, the tile in the lower left would require a refractive index of 2. The tiles in the upper left and lower right would require a refractive index of 1.5 to achieve a 0.2 mm focus-position correction. To achieve a 0.1 mm focus-position correction, the tile in the upper right would require a refractive index of 1.2.

Alternatively, in the previous example with $n_{media}=1$, all of the tiles could have been made of a material having a refractive index of 1.5. In this case, the tile in the lower left would need to be 0.9 mm thick, the upper left and lower right tiles would need to be 0.6 mm thick, and the upper right tile would be 0.3 mm thick. Clearly, combinations of different tile refractive indices and thicknesses can be used to achieve the desired focus corrections.

A large number of materials may be used to obtain the desired properties of the tiles. Clearly index of refraction is important, but uniformity of the material, cost, ease with which it can be machined and handled, scratch resistance, etc. are just some of the other material properties that might influence which material is best suited for a specific tiling application. Some materials that are believed to be useful for tiles include: glass, sapphire, fused silica, calcite, quartz, Calcium Fluoride, Magnesium Fluoride, Zinc Selenide, Zinc Sulfide, Germanium, Silicon, Gallium Arsenide, Gallium Phosphide, Aluminum Gallium Arsenide, Indium Gallium Arsenide, and KRS5 (an infrared window material that contains Tallium Bromide Thalium Iodide).

Figure 4A:
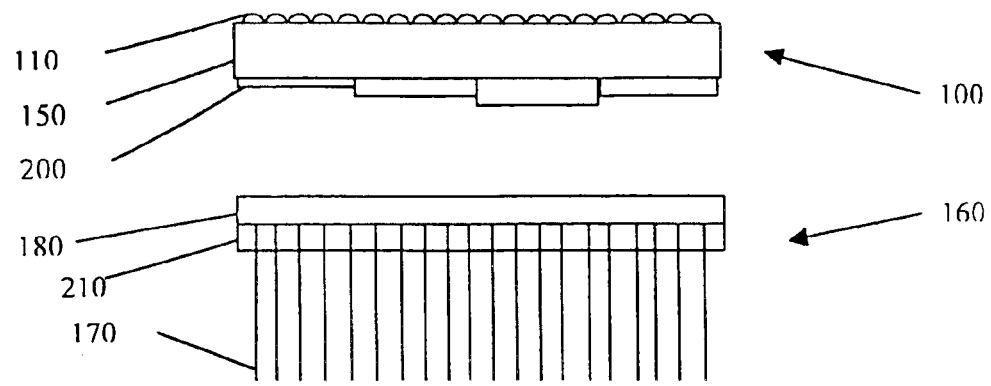
FIGS. 4A–C show different embodiments of the invention.
Figure 4B:
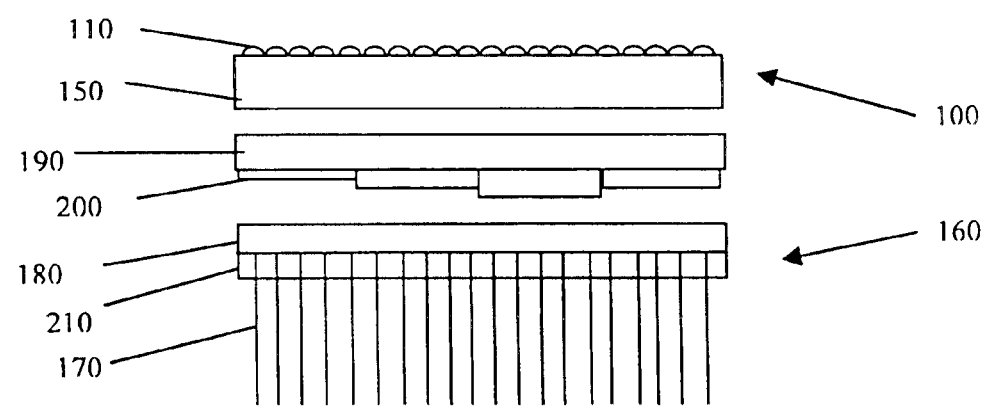
Figure 4C:
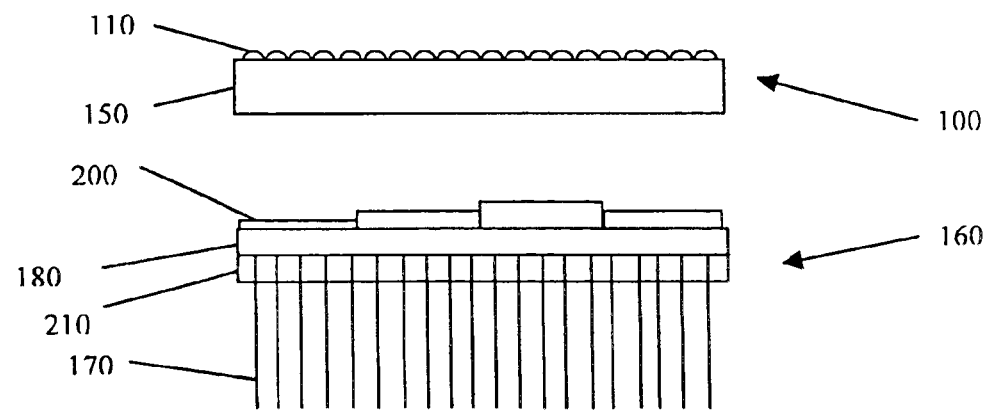

The tiles may be affixed to a variety of intervening structures to effect the focus correction. The term intervening structure is used because the structure is placed between the lenslets and the target for the collimated light. FIGS. 4A–C show side views of three different intervening structures.

In the embodiment illustrated in FIG. 4A, each lenslet 110 of the microlens array 100 is supported in a substrate 150. The light from each lenslet 110 is to be focused to a corresponding optical fiber 170, which is supported in a fiber block fiber holder 210 and covered by a fiber block window 180. The fiber block fiber holder 210 comprises one or more elements that support the optical fibers 170. The fiber block fiber holder 210 includes any appropriate means for supporting the optical fibers that is known to those skilled in the art. The plurality of optical fibers 170 attached to the fiber-block fiber holder 210 and covered by the fiber block window 180 is known as the fiber array 160. In this embodiment, each tile 200 is affixed to the substrate 150 of the microlens array 100. Although the tiles 200 are shown as having variable thickness, as discussed earlier, they may instead and/or also have variable refractive indices to achieve the desired focus correction. Note that to avoid clutter in the figure, although many lenslets, optical fibers, and tiles are shown, only one of each is explicitly labeled.

FIG. 4B illustrates an embodiment in which a window 190 serves as the intervening structure to which the tiles 200 are affixed. FIG. 4C shows an embodiment in which the tiles 200 are affixed to the fiber-block window 180 of the fiber array 160. Other embodiments that fall within the broad scope of the claims are also considered as part of the invention. For instance, some of the tiles can be affixed to the substrate 150 and others to the fiber-block window 180.

A variety of fastening techniques may be employed to affix the tiles to the intervening structure. In some preferred embodiments a bonding material is used. In the most preferred of these embodiments a curable bonding material is used. Most preferably, UV (ultraviolet) curing cement is used to affix the tiles to the intervening structure. Alternatively, adhesive free bonding (of which fusion bonding is a specific example) may also be used to affix the tiles to the intervening structure.

Because of the typically large difference in refractive index between the tiles and the external media, an antireflection coating is often added to the side of the tiles that is not affixed to the intervening structure, i.e., the side exposed to the external media. Refractive index variations between the tiles and the intervening structure are typically not so large, hence antireflection coatings are not usually employed at that interface.

The construction of focus-position compensators corresponding to the present invention can be accomplished by separately bonding each tile in its proper position. However, the invention also includes more efficient methods for making focus-position compensators for a microlens array.

To practice these methods, the spatial variation of the focus distance for the microlens array needs to be determined. One way to determine the focal length variation is with a Zygo Microlupi. A Zygo Microlupi is an instrument that can measure the exact curvature of each lenslet in a microlens array. From the curvature, the focal length of the individual lenslets is calculated using techniques known to those skilled in the art. Any additional alterations to the focus distance associated with each lenslet can then be added to the computed focal length. Knowledge of the focus distance of each lenslet is used to determine the spatial variation of the microlens focus distances. Other approaches for determining the focus variation can also be used including, for example, a Hartmann sensor.

The number of tiles, the spatial distribution of tiles, and the tile focus-position correction $\Delta_i$ of the i-th tile are chosen such that the focus variation of the microlens array is reduced to within a desired limit. The best choice for all of the parameters depends upon the details of each case.

The tile thickness $t_i$ and tile refractive index $n_i$ are selected to achieve the desired tile focus correction $\Delta_i$. As discussed earlier, a useful formula that relates the focus correction, the thickness and the refractive index is $\Delta_i = t_i(1 - n_{media}/n_i)$, where $n_{media}$ is the refractive index of the media that the tile supplants. Other relationships may be used as appropriate to determine the best choice of parameters for any given situation.

After all the tile thicknesses are known, a reference thickness $t_{ref}$ is chosen. The reference thickness should be greater than or equal to the maximum tile thickness. The reference thickness is used to determine spacer-block thicknesses. The thickness of each spacer block is designated $s_i$ and is determined by $s_i = t_{ref} - t_i$.

The tile and spacer block thicknesses are constructed to have their appropriate shapes and sizes. To reduce costs, in preferred embodiments, the tiles are cut from sheets of material that are obtained in the desired thicknesses. The sheets may be of any appropriate tile material. Silica or glass is used in the most preferred embodiments although, as discussed earlier, many other materials are suitable. The spacer blocks can be similarly constructed. If any of the spacer blocks has zero thickness (i.e., $s_i = 0$) then that spacer block is not necessary.

A tile tray having a receptacle for receiving each tile needs to be micromachined. Each of the receptacles is positioned to receive its corresponding tile. In preferred embodiments the tile tray is constructed of Silicon and is micromachined with a deep reactive ion etching (DRIE) process. The use of the tile tray greatly facilitates tile alignment, especially when many tiles are used.

All spacer blocks having finite thickness (i.e., $s_i > 0$) are placed in their respective receptacles. Each tile is placed on top of its corresponding spacer block where one exists (i.e., $s_i > 0$). For tiles with no corresponding spacer block, the tiles are just placed in their respective receptacles. Note that because of the way in which the spacer block thicknesses are determined, the sum of the tile thickness and the spacer-block thickness is always the same and equals $t_{ref}$. This means that the top of all the tiles are at the same height.

The desired intervening structure is placed on top of the tiles, aligned and bonded. The order in which this is done depends, in part, upon the type of intervening structure. As discussed earlier, in preferred embodiments the intervening structure is a substrate of the microlens array, a fiber-block window, or a window placed between the microlens array and a plurality of optical fibers.

In the case in which the intervening structure is the substrate of the microlens array or a fiber-block window, the tile tray is aligned after the intervening structure is placed on top of the tiles but prior to bonding. In the case in which the intervening structure is the substrate of the microlens array, the tile tray is usually aligned with the microlens array using X-Y positioners and a rotation stage to set the correct clocking angle. The alignment is most easily accomplished under a microscope. In preferred embodiments the alignment process tries to ensure that the tile boundaries occur between the lenslets, so that the light from a lenslet does not pass close enough to the tile boundary to become significantly distorted. A similar alignment is performed in the case in which the intervening structure is the fiber-block window. In this case, the tile tray is aligned with the optical fibers, again trying to ensure that a minimum amount of light is distorted by the tile boundaries. In preferred embodiments, the alignment is accurate to about 0.01 mm.

Any appropriate bonding process known to those skilled in the art may be used. Some preferred embodiments employ adhesive free bonding, including, fusion bonding. Other preferred embodiments employ a curable bonding material, most preferably, UV curing cement.

In cases in which a curable bonding material is used, the curable bonding material is placed on top of each tile and then the desired intervening structure is placed on top of the curable bonding material. In the case of UV curing cement, the curing involves exposure to ultraviolet radiation.

After the tiles are bonded, the tile tray and the spacer blocks are removed. The tiles are now affixed to the intervening structure. In cases in which the intervening structure is a window disposed between the microlens array and the optical fibers, the window must be aligned with the microlens array and the optical fibers. This is typically, but not necessarily done after the tiles are bonded to the intervening structure.

Figure 5A:
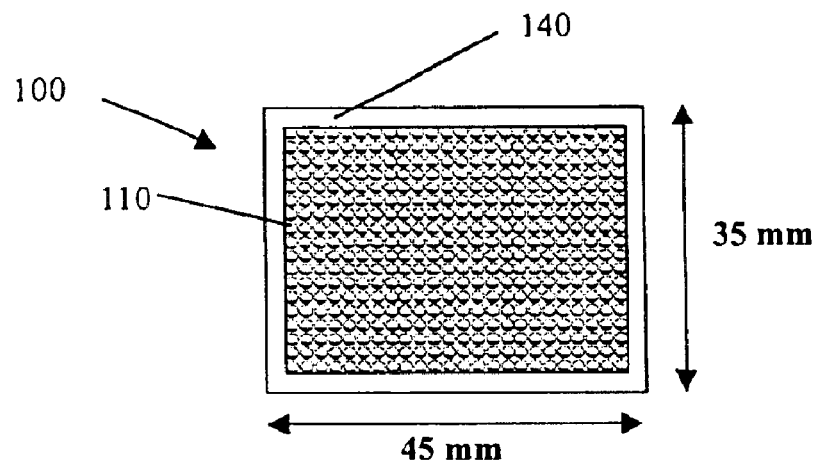
FIGS. 5A–D illustrate aspects of some steps in making a focus-position compensator according to the invention.

As a detailed example, consider a microlens array containing 1200 lenslets arranged in 30 rows of 40 lenslets each. Except that somewhat larger and fewer lenslets are shown FIG. 5A is illustrative of the example microlens array 100. Only a single lenslet 110 is labeled to reduce clutter in the figure. The lenslets 110 in this example are arranged with a 1-mm pitch, meaning that the lenslet centers are separated by 1 mm in each row and each column. Each lenslet 110 is approximately 0.95 mm in diameter, so they are separated from their nearest neighbors by approximately 0.1 mm. A 2.5-mm border 140 extends around the edges of the microlens array 100 in this example.

The spatial variation of the microlens array focus distance is determined. Four tiles, each with a refractive index of approximately 1.5 are to be used. Each tile has a rectangular planform with nominal dimensions of 15 mm by 20 mm. Three different tile thicknesses are to be used 0.129 mm, 0.258 mm, and 0.516 mm. These will produce focus-position corrections of 0.043 mm, 0.086 mm, and 0.172 mm, respectively. In this case the reference thickness is chosen as 0.516 mm; hence only three spacer blocks are required, two having a thickness of 0.258 mm and one having a thickness of 0.387 mm. Because one of the tiles has a thickness equal to the reference thickness, the corresponding spacer-block thickness is zero; therefore no corresponding spacer block is used. Although the thicknesses are defined to three significant figures, deviations in the thicknesses of as much as +/−0.01 mm have been determined to be acceptable in this example.

Although the tiles are nominally 15 mm by 20 mm, to adequately support them in a tile tray requires that they be somewhat smaller. In this example, the tiles and the spacer blocks are cut to 14.925 mm by 19.925 mm with acceptable errors of +/−0.015 mm. Note that this implies that the tiles will be separated by a gap. Providing that the collimated light beam remains sufficiently far from the edge of the tile, the gaps are not problematical.

Figure 5B:
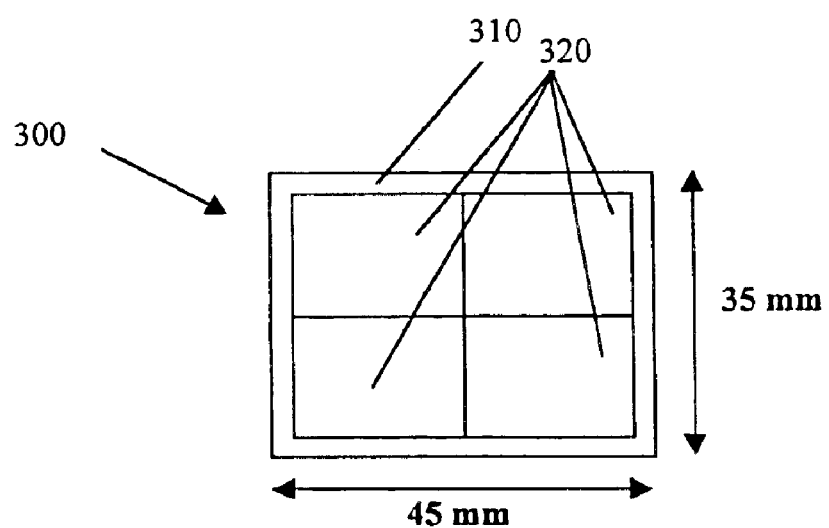

FIG. 5B shows a schematic of the tile tray 300. The starting material for the tile tray is a piece of Silicon 35 mm by 45 mm by 1.5 mm. Four rectangular receptacles 320 are micromachined in the Silicon using DRIE. These regions are 14.950 mm by 19.950 mm with a tolerance of +/−0.005 mm. The receptacles are 0.450 mm deep. A 2.5-mm border 310 is maintained around the edge of the tile tray 300 to conform to the border 140 around the edge of the microlens array 110 (as seen in FIG. 5A).

Figure 5C:
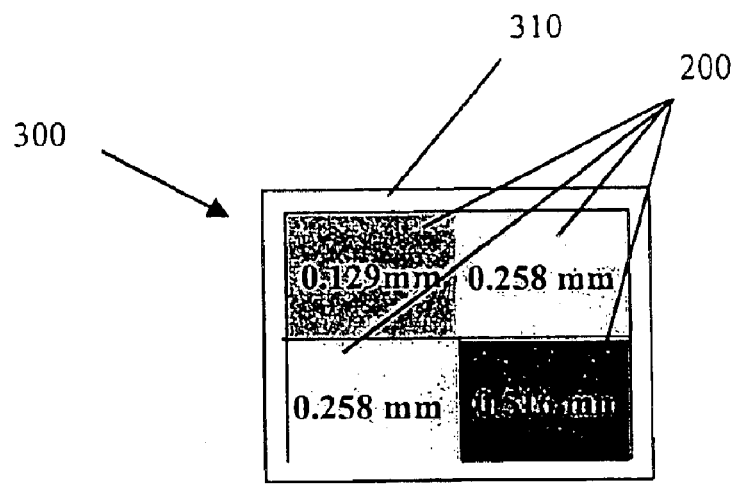

The three spacer blocks are inserted into their respective receptacles in the tile tray. Note that each one lies at the bottom of its receptacle. The four tiles are placed into their respective receptacles. Three of the tiles overlie spacer blocks; the 0.516 mm thick tile lies at the bottom of its receptacle. FIG. 5C shows the tiles 200 in the tile tray 300.

In this example, UV curing cement (for example, Norland 61) is placed on top of the tiles. The substrate of the microlens array is placed on top of the tiles. Under a microscope, using X-Y positioners and a rotation stage to set the correct clocking angle, the tile tray is aligned with the microlens array to within 0.01 mm.

Figure 5D:
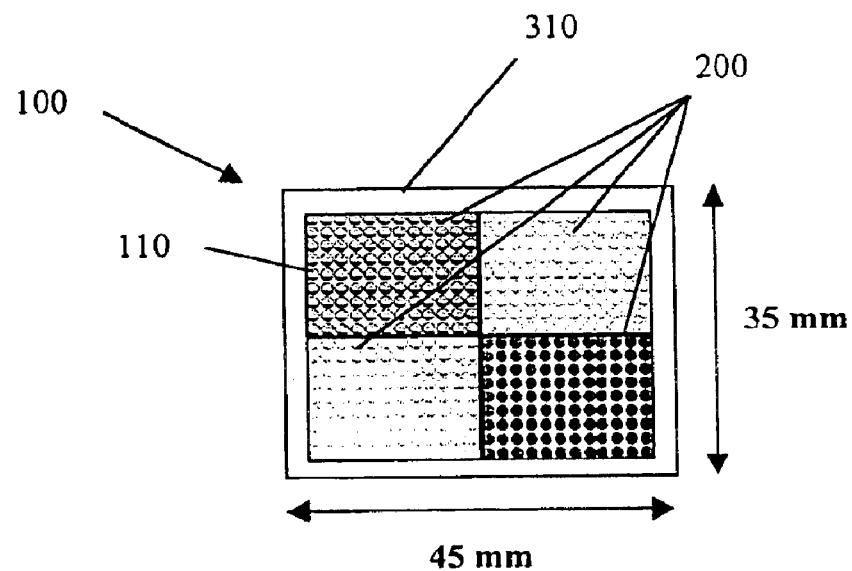

After alignment, ultraviolet radiation is used to cure the cement. The tile tray and spacer blocks are then removed. The finished product is schematically shown in FIG. 5D. The tiles 200 overlay the substrate (transparent) of the microlens array 100. The lenslets 110 can be seen through the tiles 200.

The above description and drawings are only illustrative of preferred embodiments, and the present invention is not intended to be limited thereto. Any modification of the present invention that comes within the spirit and scope of the following claims is considered part of the present invention.

What is claimed is:

1. A method of making a focus-position compensator for a microlens array having a substrate, the method comprising the steps of:

determining the spatial variation of focus distance of the microlens array;

choosing a number of tiles, a spatial distribution of tiles, and a tile focus-position correction $\Delta_i$ of the i-th tile, such that the focus variation of the microlens array is reduced to within a desired limit;

selecting a tile thickness $t_i$ of the i-th tile and a tile refractive index $n_i$, so as to obtain the chosen tile focus-position correction $\Delta_i$, choosing a reference thickness $t_{ref}$, the reference thickness being greater than or equal to the maximum tile thickness;

determining a spacer-block thickness si corresponding to the i-th tile such that $s_i = t_{ref} - t_i$;

constructing tiles, the i-th tile having thickness $t_i$;

constructing spacer blocks for all $s_i > 0$, the i-th spacer block having thickness $s_i$;

micromachining a tile tray, the tile tray having a receptacle for receiving each tile, the i-th receptacle being positioned to receive the i-th tile;

for $s_i > 0$, placing the i-th spacer block in the i-th receptacle;

placing the i-th tile in the i-th receptacle, wherein for $s_i > 0$, i-th tile is disposed on top of the i-th spacer block;

placing an intervening structure on top of the tiles;

bonding the tiles to the intervening structure;

removing the tile tray and the spacer blocks.

2. The method, according to claim 1, wherein: the bonding is adhesive free bonding.

3. The method, according to claim 1, wherein:

the bonding comprises:

placing a curable bonding material on top of each tile prior to placing the intervening structure on top of the tiles; and curing the curable bonding material after placing the intervening structure on top of the tiles.

4. The method, according to claim 3, wherein:

the intervening structure is a window placed between the microlens array and a plurality of optical fibers;

and further comprising the step of:

aligning the window with the microlens array.

5. The method, according to claim 3, wherein:

the intervening structure is a fiber-block window connected to a plurality of optical fibers;

and further comprising the step of:

aligning the tile tray with the optical fibers prior to curing the curable bonding material.

6. The method, according to claim 3, wherein:

the intervening structure is the substrate of the microlens array;

and further comprising the step of:

aligning the tile tray with the microlens array prior to curing the curable bonding material.

7. The method, according to claim 6, wherein each tile is made from glass.

8. The method, according to claim 6, wherein each tile is made from silica.

9. The method, according to claim 6, wherein the tile tray is rectangular and the receptacles are rectangular and evenly spaced.

10. The method, according to claim 6, wherein the tile tray is made from Silicon and the micromachining is done with Deep Reactive Ion Etching (DRIE).

11. The method, according to claim 6, wherein the curable bonding material is UV curing cement.

12. The method, according to claim 6, wherein a microscope and X—Y positioners and a rotation stage are used to align the tile tray and the microlens array.

13. The method, according to claim 12, wherein the tile tray and the microlens array are aligned to within 10 $\mu$m.

* * * * *

UNITED STATES PATENT AND TRADEMARK OFFICE
CERTIFICATE OF CORRECTION

PATENT NO. : 6,867,921 B2
DATED : March 15, 2005
INVENTOR(S) : Harwit et al.

It is certified that error appears in the above-identified patent and that said Letters Patent is hereby corrected as shown below:

Column 8,
Line 55, delete "si" and insert -- $s_i$ --.

Signed and Sealed this

Second Day of August, 2005

JON W. DUDAS
*Director of the United States Patent and Trademark Office*